Aug. 6, 1957 R. F. RIEGEL 2,801,832
APPARATUS FOR MIXING FEEDS WITH MOLASSES
Filed July 18, 1955

INVENTOR
Robert F. Riegel
BY B. B. Darney
ATTORNEY

United States Patent Office 2,801,832
Patented Aug. 6, 1957

2,801,832

APPARATUS FOR MIXING FEEDS WITH MOLASSES

Robert F. Riegel, Greenville, Ohio

Application July 18, 1955, Serial No. 522,724

3 Claims. (Cl. 259—23)

This invention is a Apparatus For Mixing Feeds With Molasses and includes a vertical feed mixer near the top of which latter the ground feed is expelled preparatory to surface impingement of the ground feed with cold molasses sprayed upwardly, within the mixer, to engage the gravitating feed, the feed being repeatedly lifted and expelled in a continuous operation until the desired amount of molasses has been mixed with the feed prior to bagging.

Another object of the invention is to provide a feed grinding plant with multiple vertical feed mixers each of which is equipped with a strategically positioned molasses feed pipe to coat the ground feed immediately after its expulsion from the mixing conduit, the molasses being selectively supplied, at predetermined pressures, to the mixers at the option of the operator.

After much experiment I have found it possible to employ, in combination with a standard vertical feed mix, a molasses spray pipe with outlets opening upwardly on opposite sides of the ground feed discharge tube or conduit to effect surface impingement of the feed, whether in a pulverulent or comminuted state, while the feed gravitates to the bottom of the mixer. This invention is now being practiced using blackstrap cold molasses, regardless of weather temperatures, without "gumming" the mixer. This is in contradistinction to cold molasses feeders of the type shown in the patent to Shelton, No. 1,829,066 of October 27, 1931 wherein the cold molasses is forced to an elevated point above the mixer and allowed to gravitate into a horizontally arranged mixer which includes rotary spiral beaters impinged by the molasses with obvious disadvantages. With my invention the molasses does not contact the mixer beaters or any other part of the mixer.

Other objects of the invention will be manifest from the following description of the invention, taken in connection with the accompanying drawings, wherein.

Figure 1:
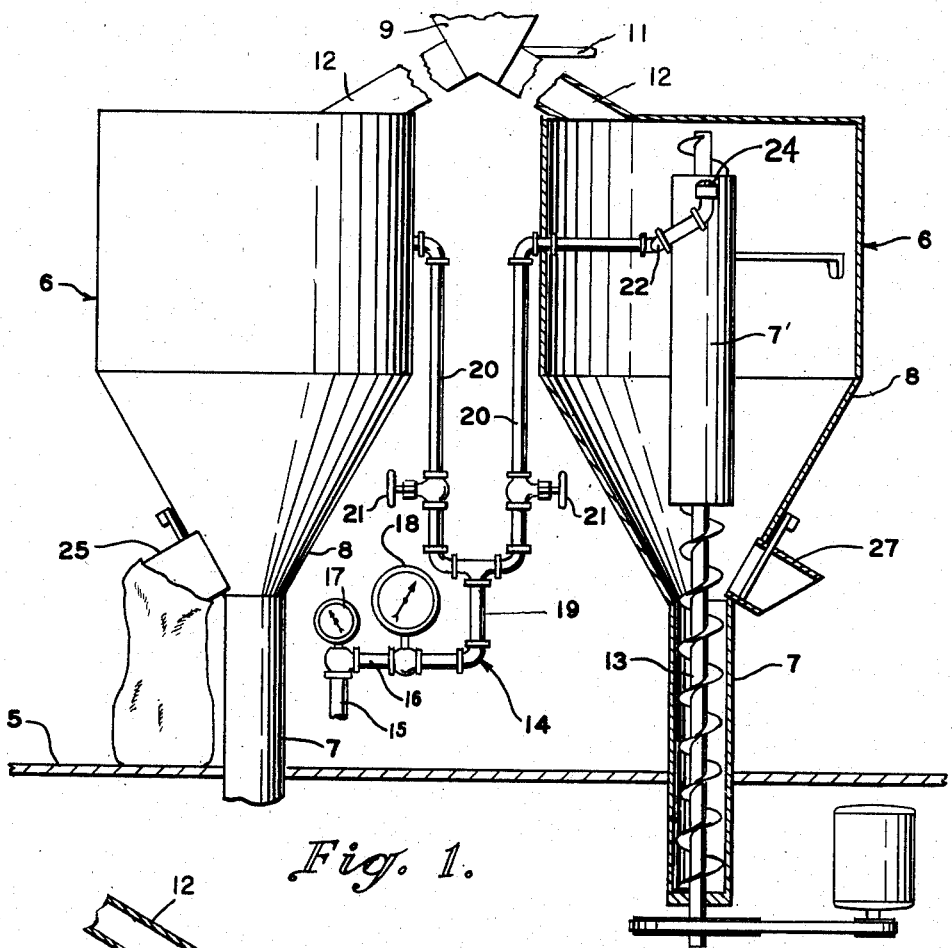
Fig. 1 is a fragmentary view of a feed grinding plant including twin vertical feed mixers, one of which is shown in vertical section and the other in side elevation.
Figure 2:
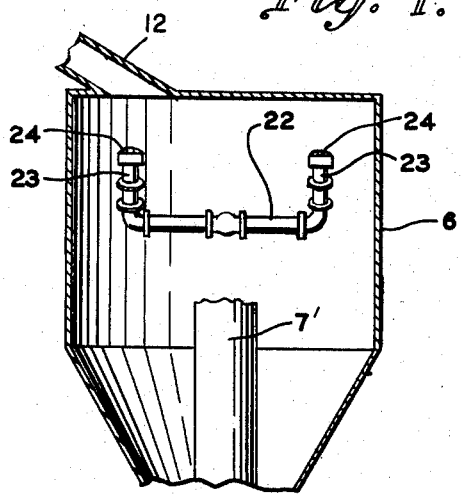
Fig. 2 is a side elevational view of a vertical feed mixer as used in the present invention, a part thereof being broken away to show the molasses feed pipe and its manifold.
Figure 3:
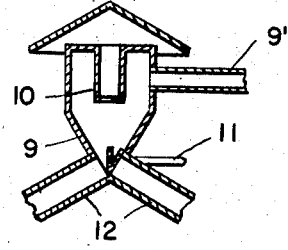
Fig. 3 is a vertical sectional view of the dust collector showing attached feed inlet pipes fragmentarily.

It is within the contemplation of this invention to use a feed grinding plant of standard construction and to include therein, one, two or more vertical feed mixers to which molasses is fed from a common source of supply and pumped under predetermined pressure to the mixer. This is not shown in the drawings, since any conventional arrangement of piping, etc. may be used such as shown in the patent to Shelton, referred to supra. The plant includes a floor 5 through which portions of twin feed mixers generally designated 6 extend. Each of the mixers includes a cylindrical vertical tube the lower end of 7, which at a point above the floor 5 issues into a casing 8, the lower part of which is of inverted frusto-conical form and leads to a cylindrical upper section, the top of which is closed. A conventional dust collector 9 having a centrally located air and dust tube 10, is mounted above and between the twin feed mixers and connected to a hammer mill by an air and feed inlet 9'. A conventional valve operated by a hand lever 11 is provided for alternately opening a pair of passageways 12 through which the feed flows to either vertical feed mixer 6. A cylindrical conduit 7' is concentrically mounted in the casing 8 in axial alignment with the tube 7. Each of the tubes 7 and conduit 7' has rotatably mounted therein, a conventional conveyor auger 13 the upper end of which extends above the top of the conduit 7' as shown in the mixer at the right side of Fig. 1. The auger 13 is powered in any suitable manner and is adapted to convey the feed upwardly to a point above the conduit where it is scattered outwardly toward the walls of the casing 8.

It is within the teaching of this invention to combine with the conventional feed mixers herein shown and described, a positive and effective means for surface coating the feed with molasses while the feed is in a state of suspension, and then permitting the coated feed to gravitate to the lower part of casing 8 where the feed is again lifted by auger 13 and treated with molasses. This operation is repeated until the desired impregnation is attained. The molasses feed system, generally designated 14 includes a system of tubing or piping comprising a pipe 15 which leads from any suitable molasses pump (not shown) connected to a source of supply. Pipe 15 communicates with a tributary 16 carrying a pressure gauge 17 and a conventional molasses meter 18, the latter having a micromatic switch for shutting off the molasses pump after a predetermined amount of molasses has been mixed with the feed. Tributary 16 communicates with a pipe section 19 which, in turn, is connected with feed pipe branches 20. Each branch is adapted to extend into a casing 8 as shown in the drawings. Each branch is also provided with a valve 21 so that the mixers may be selectively fed at the option of the user. The upper end of each branch 20 enters a manifold 22, the opposite ends of the latter extending beyond the conduit 7' and being turned upwardly to provide outlet terminals 23. Each of the outlet terminals carries a perforate cap 24 through which the molasses is sprayed. As will be noted from the drawings, the caps are located appreciably below the top of the conduit 7' so as to allow ample space for scattering the feed before impingement is made by the molasses forced through the openings in caps 24. The admixture of feed and molasses gravitates to the bottom of the casing where it is lifted by auger 13 as many times as necessary to impregnate the feed with the molasses. The mixed feed and molasses is then removed through bagger outlet 25.

In use of this device, the feed is blown from a hammer mill under air pressure through inlet 9' into the dust collector 9 where it swirls about air and dust tube 10. The feed gradually gravitates downward into either of the vertical mixers 6, depending upon the position of lever 11. The air and dust are emitted from the dust collector through tube 10 in a well known manner. After entering vertical mixer 6, the feed gravitates to the bottom of casing 8 and when it has collected in an amount to engage the lower terminal of conduit 7' the molasses feed system 14 may be actuated. Valve 21 is opened to admit molasses to the selected mixer and molasses meter 18 is set to control the quantity of molasses flowing into the vertical mixer 6. The molasses pump is then actuated to feed the molasses under pressure through pipe 15 and the connected piping to caps 24 where it is sprayed through ⅛ inch openings. Caps 24 are strategically positioned to effect desired impingement of the molasses with the feed while the latter is in a state of suspension. The treated feed gravitates to the bottom of casing 8 where it is again lifted by auger 13 in a continuous operation. This cycle is repeated until the desired mixture of feed and molasses is obtained at which time the molasses pump is deenergized by the action of the micromatic switch.

By this arrangement of parts, there is no accumulation of molasses on any part of the mixer. The openings of caps 24 point upwardly to effect optimum coating of the feed, in addition to preventing drippage of the molasses from the caps after the valves are shut off and feed bagged from the mixer. There must always be sufficient feed in the mixer to be thrown out at the top of the conduit before the molasses is applied. If feed mixer 6 is filled to capacity, the molasses will still pass through the openings under seventy pound pressure. I have found that by using this apparatus as herein shown and described, I can use blackstrap cane molasses of Brix 79.5, Baumé 42.25 and spray directly into feed mixers, regardless of weather temperatures and without heating the molasses before it is sprayed into the mixers.

While I have herein shown and described a preferred embodiment of my invention, it is nevertheless to be understood that various changes may be made therein, within the scope of the appended claims.

What I claim is:

1. Apparatus for mixing molasses with ground feed including a casing having a closed top provided with a feed inlet, a vertical conduit extending centrally of said casing and terminating at the upper end in spaced relation below the top and at its lower end above the bottom of the casing, a conveyor for the feed extending through said conduit and projecting thereabove and therebelow, a molasses supply pipe extending into said casing and having upstanding laterally extending branches on opposite sides of said conduit, and spray means fitted on the upper ends of said branches whereby the molasses is sprayed upwardly through the feed.

2. The apparatus of claim 1 wherein the spray means are located below the horizontal plane of the upper end of the conduit.

3. Apparatus for mixing molasses with ground feed including a casing having a closed top, a vertical conduit extending centrally of said casing and terminating at its upper end in spaced relation below the top and at its lower end above the bottom of the casing, the casing top having an opening therein through which ground feed is initially introduced in an amount sufficient to engage the lower terminal of the conduit, means in the conduit for conveying feed through and over the top of the latter, and a molasses supply pipe extending into the casing and having upstanding laterally extending branches on opposite sides of said conduit, and spray means on the upper ends of said branches whereby the molasses is sprayed upwardly through the feed.

References Cited in the file of this patent

UNITED STATES PATENTS

| | | |
|---|---|---|
| 1,691,535 | True | Nov. 13, 1928 |
| 1,728,411 | Howard | Sept. 17, 1929 |
| 1,769,575 | Haines | July 1, 1930 |
| 1,788,345 | Skirvin | Jan. 6, 1931 |
| 2,192,806 | Smith | Mar. 5, 1940 |